N. BAKER.
Insect Destroyer.
No. 79,097.
Patented June 23, 1868.
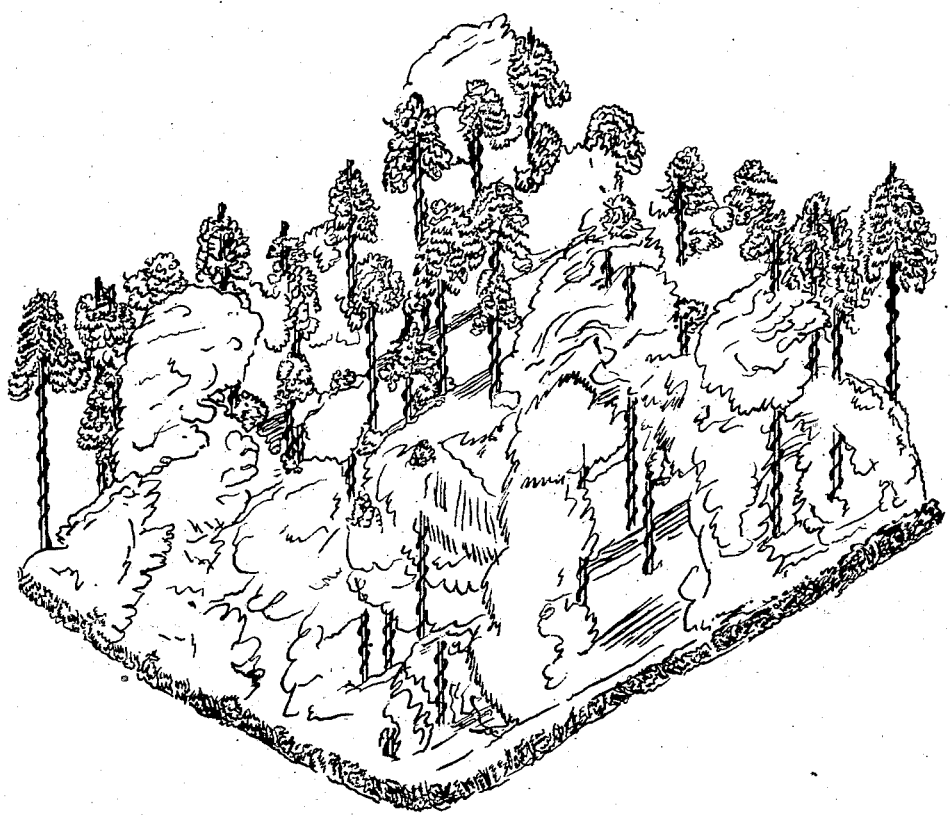
Witnesses:
Geo C Green
Wm Morgan
Inventor:
Nelson Baker
By his Attys.
J. B. Woolley ...

United States Patent Office.

NELSON BAKER, OF ALGANZEE, MICHIGAN.

Letters Patent No. 79,097, dated June 23, 1868.

IMPROVEMENT IN CULTIVATING HOPS.

The Schedule referred to in these Letters Patent and making part of the same.

TO ALL WHOM IT MAY CONCERN:

Be it known that I, NELSON BAKER, of Alganzee, in the county of Branch, and State of Michigan, have invented certain new and useful Improvements in Cultivating Hops, and providing means for preventing lice and other insects from injuring or destroying them while growing; and the following is a full, clear, and exact description of the same, reference being had to the accompanying drawings, making a part of this specification, in which—

Figure 1 represents a perspective view of a hop-field, with the poles set in rows, and the hop-vines growing on them; also showing the smoke and vapor of burning smudges in the rows on the windward sides of the field passing in among the vines of the growing hops.

The object of my invention is to get the largest possible yield on a given space, by the use of strong fertilizers, and also to save the hops from injury, or from being destroyed by lice or other insects, while they are growing, which is often the case when they are made to grow rank, by the use of fertilizers, or in strong rich soil.

My invention consists in preparing smudges, made of saw-dust, leaves, straw, weeds, pennyroyal, or any vegetable combustible substance, by mixing or moistening it with a diluted solution of sulphuric or muriatic acid, paraffine, coal, gas, or other tar, and placing it in rows or in piles on the windward sides, or in among the rows of the growing vines of hop-fields, and setting them on fire, thus making smudges, from whence the smoke and fumes are blown in amongst the vines, and come in contact with the foliage, and will very speedily kill and destroy all of the lice, bugs, or other insects that prey upon the hops.

To enable others to understand and practise my improved method of cultivating and saving hops, so as to insure a good crop, I will proceed to describe it more in detail.

It is well known to all scientific agriculturists that to insure a good crop of anything that grows on climbing vines, and especially such as make their vines or wood annually, it requires a rich, strong soil, and that in most sections of the country it is necessary to use manure or some other fertilizers, which have the tendency to breed various kinds of insects. There is perhaps nothing which grows that is more subject to be overrun with lice than the hop in certain stages of its growth.

To keep the vines from being injured by lice or other insects, I take fine-cut chips or saw-dust, and sprinkle or partially saturate it with the ingredients above described, and place it on the windward side, near the growing hops, or in among them, and when set fire to, will burn slowly, and smoulder away for a considerable length of time, quite sufficient for the smoke and fumes to penetrate all through the vines and foliage, and kill and destroy all of the insects which injure or destroy the crop. One or two applications of the smudges is quite sufficient, for the season, to accomplish the purpose, as none of the hop-destroying insects will go on the vines as long as there is any smell of the fumes left.

Having been engaged a number of years in raising hops, and from practical experience have demonstrated the fact that a good and reliable crop may be grown every year, where the climate is suitable, in any soil, by using manure or other fertilizers, and by the application of smudges for destroying the insects in the manner as above described.

What I claim as my invention or discovery in cultivating hops, is—

The herein-described method of destroying insects upon hop-vines in the open field, by subjecting the vines to the action of pyroligneous, sulphurous, hydrocarbon, or other similar vapors, in the manner specified.

In testimony whereof, I hereunto subscribe my name in the presence of—

NELSON BAKER.

Witnesses:
D. N. GREEN,
JOHN CHANDLER.